(12) United States Patent
Ochiai

(10) Patent No.: US 6,734,985 B1
(45) Date of Patent: May 11, 2004

(54) PRINTING APPARATUS, PRINTING SYSTEM AND METHOD OF CONTROLLING SAME

(75) Inventor: Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/382,339

(22) Filed: Aug. 25, 1999

(30) Foreign Application Priority Data

Aug. 25, 1998 (JP) .......................................... 10-239119

(51) Int. Cl.$^7$ .......................... G06F 15/00; G06F 13/00
(52) U.S. Cl. ...................... 358/1.15; 358/1.14; 358/1.9; 710/19
(58) Field of Search .............................. 358/1.15, 1.14, 358/1.9; 710/19

(56) References Cited

U.S. PATENT DOCUMENTS

| | | | | |
|---|---|---|---|---|
| 5,537,626 A | * | 7/1996 | Kraslavsky et al. | 710/8 |
| 5,848,318 A | * | 12/1998 | Okimoto | 399/8 |
| 5,943,503 A | * | 8/1999 | Kai | 708/833 |

FOREIGN PATENT DOCUMENTS

| | | |
|---|---|---|
| JP | 7-248889 A | 9/1995 |
| JP | 8-174964 A | 7/1996 |
| JP | 8-265362 A | 10/1996 |
| JP | 8-286989 A | 11/1996 |
| JP | 8-328648 A | 12/1996 |
| JP | 9-181723 A | 7/1997 |
| JP | 9-233213 A | 9/1997 |
| JP | 10-83386 A | 3/1998 |

\* cited by examiner

Primary Examiner—Edward Coles
Assistant Examiner—Alan Rahimi
(74) Attorney, Agent, or Firm—Fitzpatrick, Cella, Harper & Scinto

(57) ABSTRACT

A printer module for giving notification of the status of the printer receives a request from a host to the effect that the host be registered as the destination of printer-status notification. The printer module responds by registering the host as a printer-status notification destination in a notification-destination registration table. The registered information includes registration retention time. A time-out module in the printer deletes registration, for which the retention time has expired, from the notification-destination registration table.

21 Claims, 15 Drawing Sheets

FIG. 10

| 1001 | REGISTERED ID | 1234 | 2233 | 3124 |
|---|---|---|---|---|
| 1002 | NOTIFICATION-DESTINATION PROTOCOL | TCP/IP | TCP/IP | TCP/IP |
| 1003 | NOTIFICATION-DESTINATION ADDRESS | 192.1.2.155 | 192.1.2.168 | 192.1.2.121 |
| 1004 | NOTIFICATION-DESTINATION PORT NO. | 9045 | 9045 | 9045 |
| 1005 | REGISTRATION RETENTION TIME | 10 MINUTES | 120 MINUTES | 60 MINUTES |

# PRINTING APPARATUS, PRINTING SYSTEM AND METHOD OF CONTROLLING SAME

BACKGROUND OF THE INVENTION

This invention relates to a printing system comprising such components as a computer terminal and printer connected by a network, by way of example.

When printer information is monitored from a host computer via a network, the conventional approach is to adopt a polling method in which the host computer (referred to as the "host" below) periodically sends the monitored printer a command for obtaining the status of the printer and receives a response from the printer. Using polling makes it possible for the host to acquire the status of the printer at any desired timing. However, if there are many hosts on the network and these hosts monitor the status of a single printer, polling results in a very large number of packets being sent on the network in order to acquire the printer status. This not only increases the load on the network controller of the printer but also increases the load on the entire network. There is the danger, therefore, than this will cause the network to go down.

Rather than monitoring printer status by such polling, a method being considered involves the printer notifying the host of its status when the printer status changes. If the host monitors printer status using this method, it is possible to reduce the load on the network controller of the printer and the load on the network, thus enabling monitoring to be performed more efficiently.

In this method of monitoring printer status based upon notification from the printer, it is required that the host that is the destination of the status report from the printer be registered with the printer. The printer notifies the registered host of its changed status. This means that if the host wishes to monitor the status of the printer, it is required that the host be registered with the printer as the destination of the report of the change in status. If it then becomes unnecessary for the host to monitor the status of the printer, it is required that the host be deleted from report destinations registered with the printer.

In this method, the report destinations are controlled not by the printer but by the host. The registered report destinations are never deleted under the control of the printer without an instruction from the host. Therefore, a problem arise in that if the host goes down and cannot be deleted from the status-change report destinations registered in the printer, the printer will continue to notify the host of changes in its status.

Since a report destination that has failed to be deleted will not be deleted as long as the printer power supply is not turned off, the memory area that is for registering report destinations becomes cluttered and it will eventually become impossible for the printer to register a notification request from any host.

SUMMARY OF THE INVENTION

Accordingly, an object of the present invention is to provide a printing apparatus, printing system and method of controlling the same in which the destination of a status-change report can be updated automatically by providing registration of a status-change report with an expiration time.

According to the present invention, the foregoing object is attained by providing a printing system comprising a computer terminal and a network printer, wherein the computer terminal includes: means for creating a status notification request which causes printer status to be posted periodically; means for periodically transmitting a printer-status notification registration request; means for transmitting a printer-status notification deletion request; means for receiving printer status notification from the printer; and means for displaying printer status in dependence upon the printer status; and the network printer includes: means for receiving a printer-status notification registration request from at least one computer; means for registering each printer-status notification registration request as registration information; means for deleting the registration information if the printer-status notification registration request has not been received from the same computer within a registration retention time defined in the printer-status notification registration request; means for updating the registration retention time anew if the printer-status notification registration request has been received from the same computer within the registration retention time defined in the printer-status notification registration request; sensing means for sensing a change in printer status; means for notifying a network address of a computer, which is defined in the registration information, of a change in printer status sensed by the sensing means; means for receiving the printer-status notification deletion request of a computer; and means for deleting the registration information in response to the printer-status notification deletion request.

Further, the foregoing object is attained by providing a printing apparatus for accepting a status notification request from an external device, registering the device as a destination of status notification and notifying the registered device of a change in status, wherein after status notification is requested by a certain device, this device is removed as a destination of status notification if a status notification request is not made by the device afresh upon elapse of a predetermined period of time.

Further, the foregoing object is attained by providing a printing system having at least one information processing apparatus and a printing apparatus, wherein the information processing apparatus issues a status notification request to the printing apparatus at prescribed time intervals, and the printing apparatus registers the information processing apparatus that issued the status notification request as a destination of status notification, and invalidates this registration if, after the registration is made, a predetermined period of time elapses without receipt of a status notification request afresh.

Further, the foregoing object is attained by providing a method of controlling a printing system, in which a status notification request is issued from an information processing apparatus to a printing apparatus, and whenever the status notification request is received, the printing apparatus registers, as a destination of status notification, the information processing apparatus that issued the status notification request, and invalidates this registration if, after the registration is made, a predetermined period of time elapses without receipt of a status notification request afresh.

Further, the foregoing object is attained by providing a computer-readable storage medium storing a program that causes a computer to execute the following functions: accepting a status notification request from an external device registering the device as a destination of status notification; notifying the registered device of a change in status; and after status notification is requested by a certain device, removing this device as a destination of status notification if a status notification request is not made by the device afresh upon elapse of a predetermined period of time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram showing the format of a registration notification table retained by the printer;

DESCRIPTION OF THE PREFERRED EMBODIMENT

Figure 1:
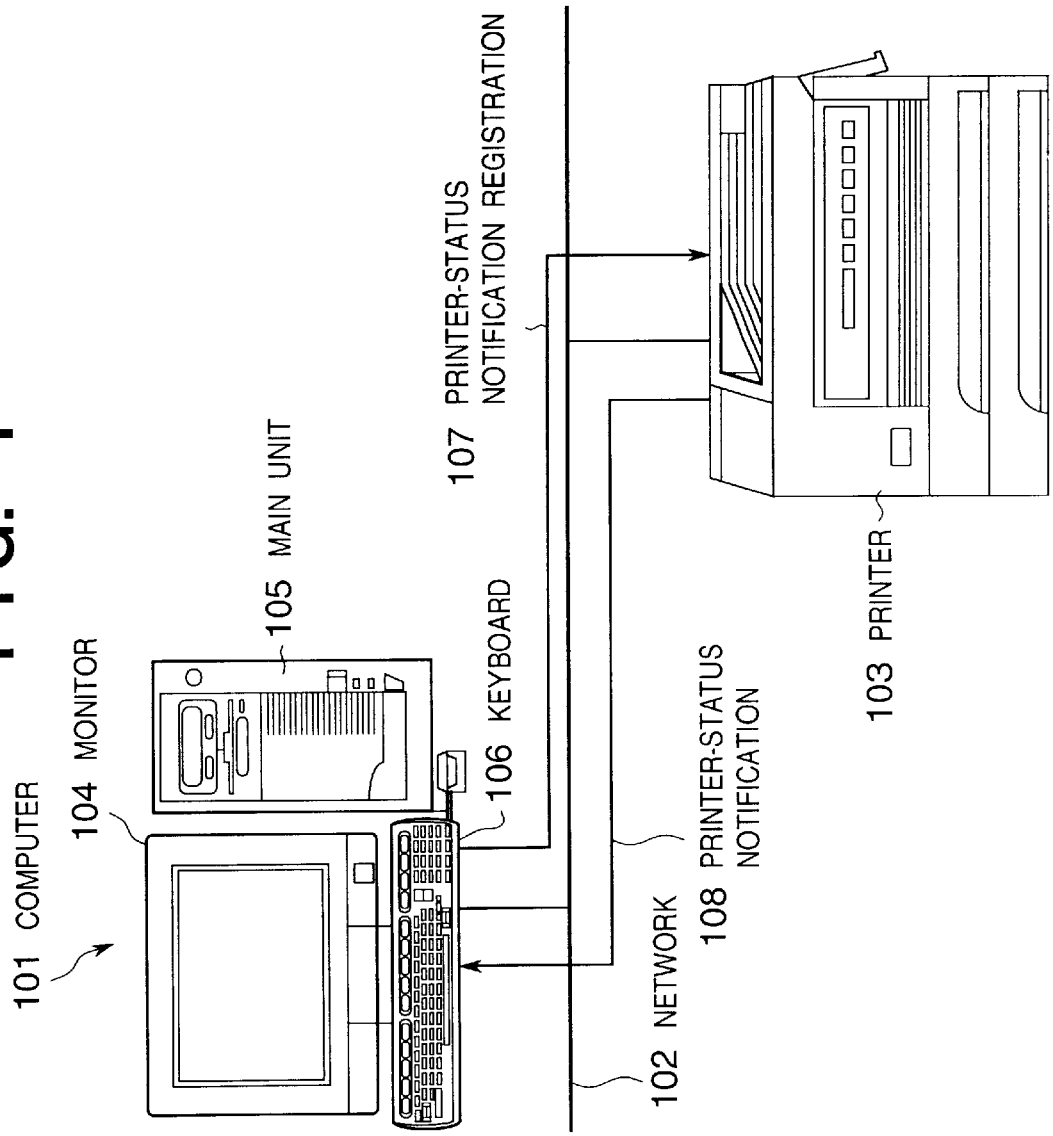
FIG. 1 is a diagram showing the configuration of a printing system.

FIG. 1 is a diagram showing the configuration of a printing system according to this embodiment.

The system shown in FIG. 1 includes a computer 101 comprising a monitor 104, a main unit 105 housing a hard disk and a CPU, and a keyboard 106 for receiving key inputs from a user. The computer 101 is connected to a laser printer 103 via a network 102.

The computer 101 transmits a printer-status notification registration request 107 to the laser printer 103 via the network 102. If the status of the printer stages, the laser printer 103 transmits a printer-status notification 108 to the computer 101 via the network 102.

Figure 2:
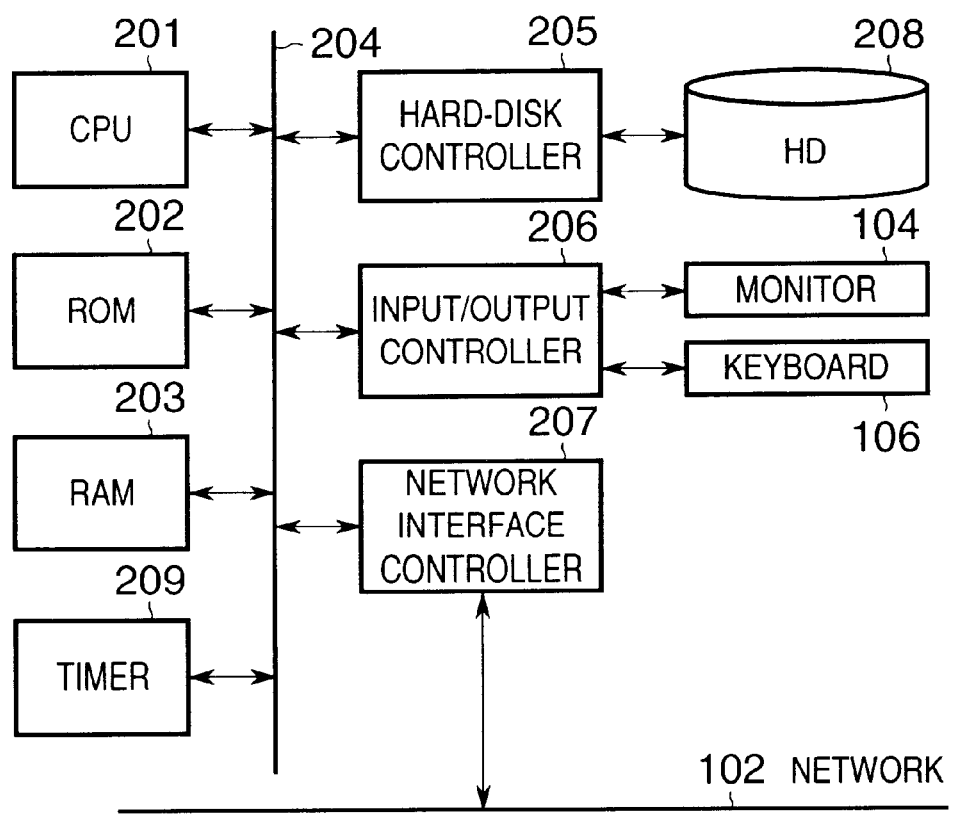
FIG. 2 is a block diagram showing the internal structure of a computer.

FIG. 2 is a block diagram showing the internal structure of the computer 101.

The computer 101 has a CPU 201 for controlling the overall apparatus by executing a program that has been stored in a ROM 202 or RAM 203. The ROM 202 stores a program and data needed to boot-up the apparatus. The RAM 203 stores data temporarily and is for loading programs. A hard disk 208 stores program files and data files and is controlled by the CPU 201 via a hard-disk controller 205. An input/output controller 206 controls output to the monitor 104 and input from the keyboard 106. A network interface controller 207 controls communication with the network 102. A timer 209 is used to measure time and, when a set time elapses, notifies the CPU 201 of time expiration. These controllers are controlled from the CPU 201 via a CPU bus 204.

Figure 3:
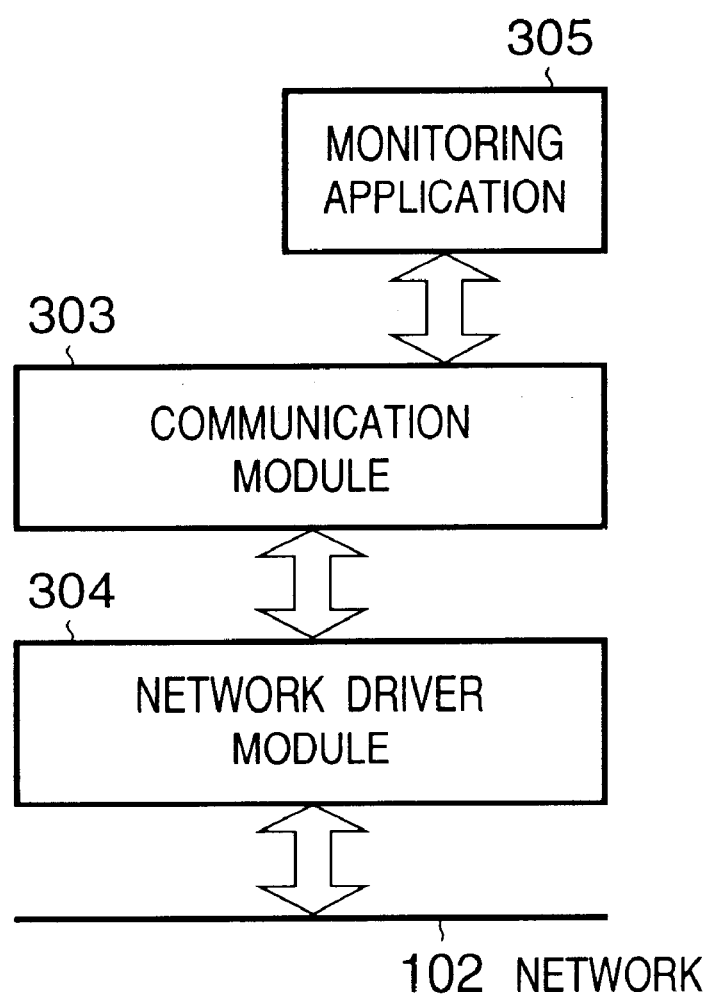
FIG. 3 is a diagram showing the content of a program of the computer.

FIG. 3 is a diagram showing the content of a program of the computer 101.

A communication module 303 is for performing communication by controlling a network communications protocol. A network driver module 304 controls the network interface controller 207. A monitoring application 305 monitors the status of the printer. These modules are run by the CPU 201 upon being loaded into the RAM 203 from the hard disk 208 of the computer 101. The monitoring application 305 sends the printer 103 a printer-status notification registration request and monitors the status of the printer in dependence upon the printer status reported by the laser printer 103.

Figure 4:
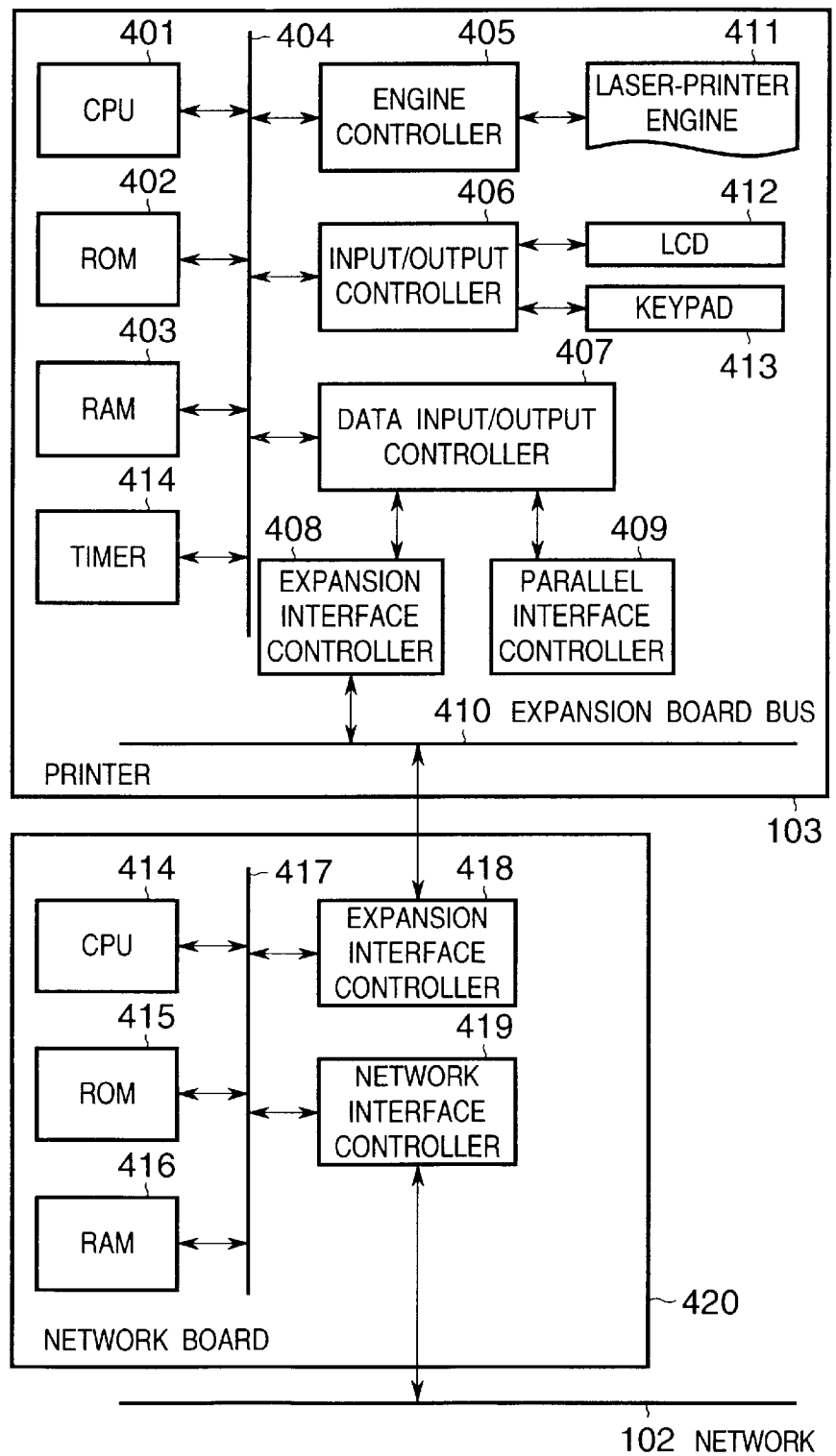
FIG. 4 is a block diagram showing the internal structure of a printer.

FIG. 4 is a block diagram showing the internal structure of the printer 103.

A CPU 401 controls the overall printer. A program executed by the CPU 401 is stored in a ROM 402. A RAM 403 stores data and programs used by the CPU 401. A timer 414 measures time. Controllers are connected by a bus 404. An engine controller 405 controls a laser-printer engine 411, and an interface controller 406 controls an LCD 412, a keypad 413 for receiving key inputs, etc. A data input/output controller 407 controls input and output of data to and from an external device, and controls an expansion interface controller 408 and a parallel interface controller 409. The expansion interface controller 408 is connected to a network board 420 via an expansion board bus 410.

The network board 420 comprises a CPU 414, a ROM 415 in which a program has been stored, a RAM 416, an expansion interface controller 418, a network interface controller 419 for communicating with a network, and a bus 417 for connecting these components. Data that has entered from the network interface controller 419 is controlled by the CPU 414 and transmitted to the printer 103 as print data via the expansion interface controller 418.

Figure 5:
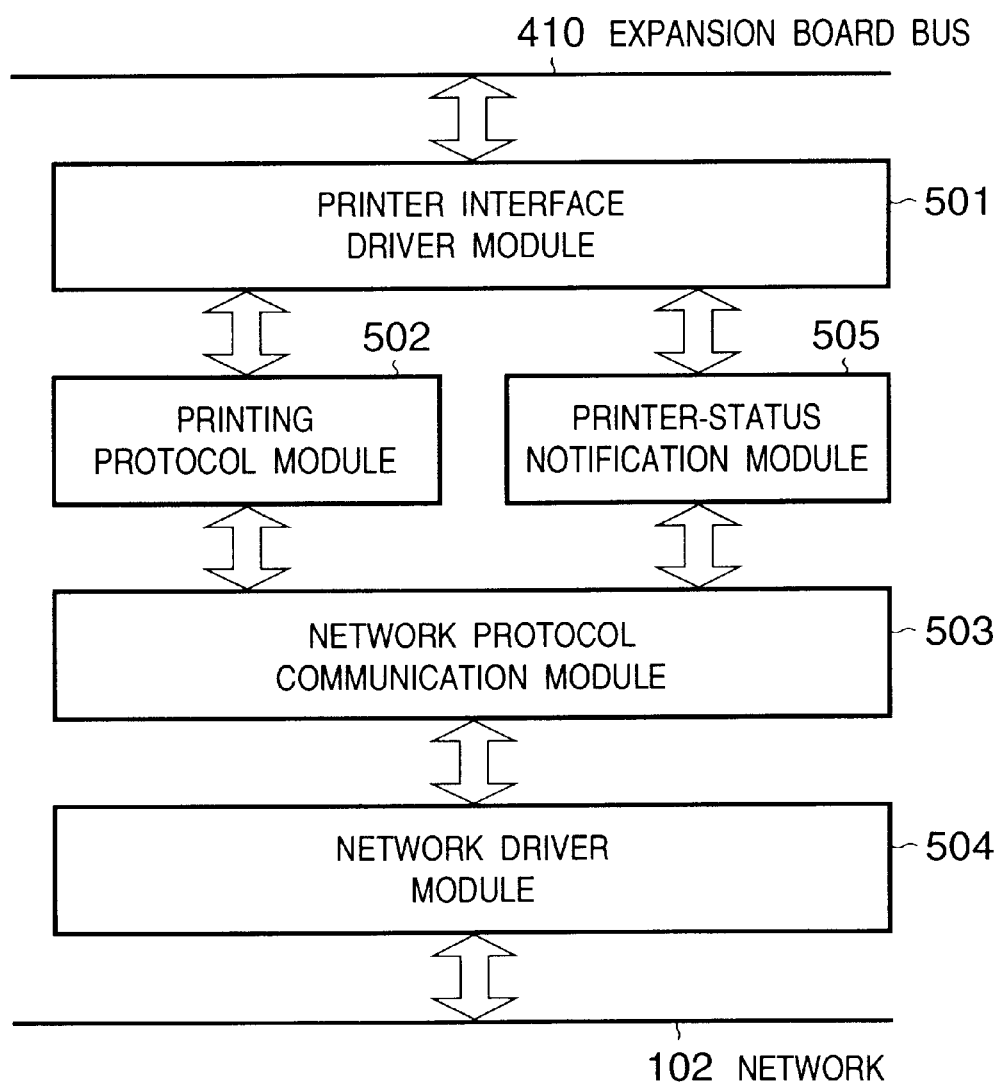
FIG. 5 is a diagram showing the content of a program of a network board.

FIG. 5 is a diagram showing the content of a program of the network board 420.

A printer interface module 501 controls the expansion interface controller 418 to send data to and receive data from the printer. A printing protocol module 502 supports a network general-purpose printing protocol, and a network protocol communication module 503 controls communication with a network. A network driver module 504 is a routine for controlling the network interface controller 419 and for actually sending and receiving packets over the network.

The printing protocol module 502 receives print data from the network, in accordance with a print communication procedure decided by the protocol, using the network protocol communication module 503. The print data that has been received is sent to the printer via the printer interface module 501. A printer-status communication module 505 transmits the status of the printer to the computer 101 over the network 102.

Figure 6:
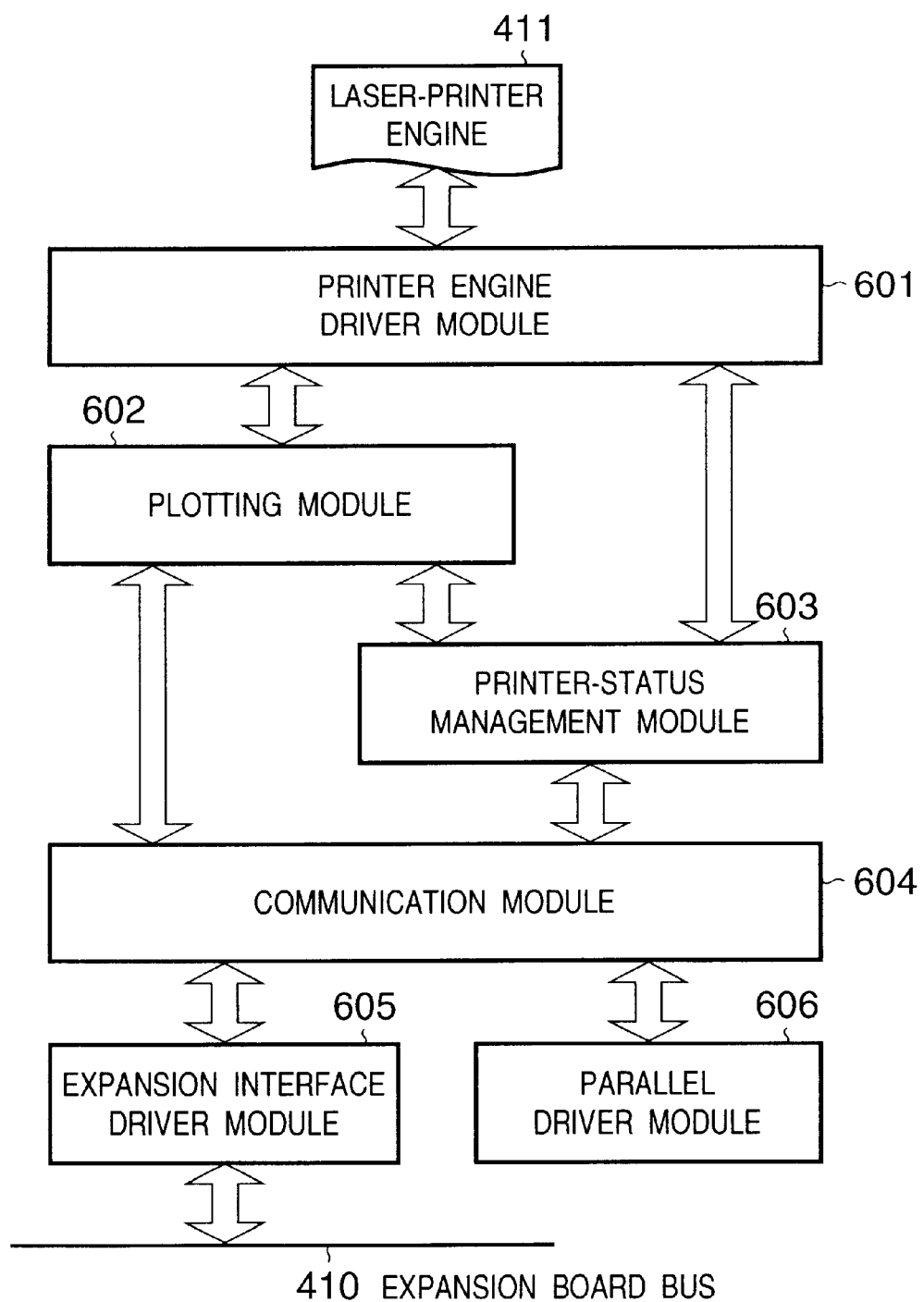
FIG. 6 is a diagram showing the content of a program of the printer.

FIG. 6 is a diagram showing the content of a program of the printer 103.

An expansion interface driver module 605 controls the expansion interface controller 408, which receives a job from the network board 420. Similarly, a parallel interface driver module 606 controls the parallel interface controller 409. A communication module 604 receives the job from the expansion interface driver module 605. A printer-status management module 603 manages the status of the printer and, if there is a change in the status of the printer, transmits notification of the printer status to the registered destination of the report on printer status. A plotting module 602 expands the print data into a bitmap. A printer engine driver module 601 controls the engine controller 405, which controls the laser-printer engine 411. The print data that has been expanded into the bitmap is sent to the laser-printer engine 411 by the printer engine driver module 601, whereby the print data is printed. Further, the printer engine driver module 601 controls the engine controller 405, monitors the status of the laser-printer engine 411 and notifies the printer-status management module 603 of the printer status, i.e., whether the printer is jammed, whether printing has ended, whether the printer cover is open, whether the printer is out of paper, etc.

Figure 7:
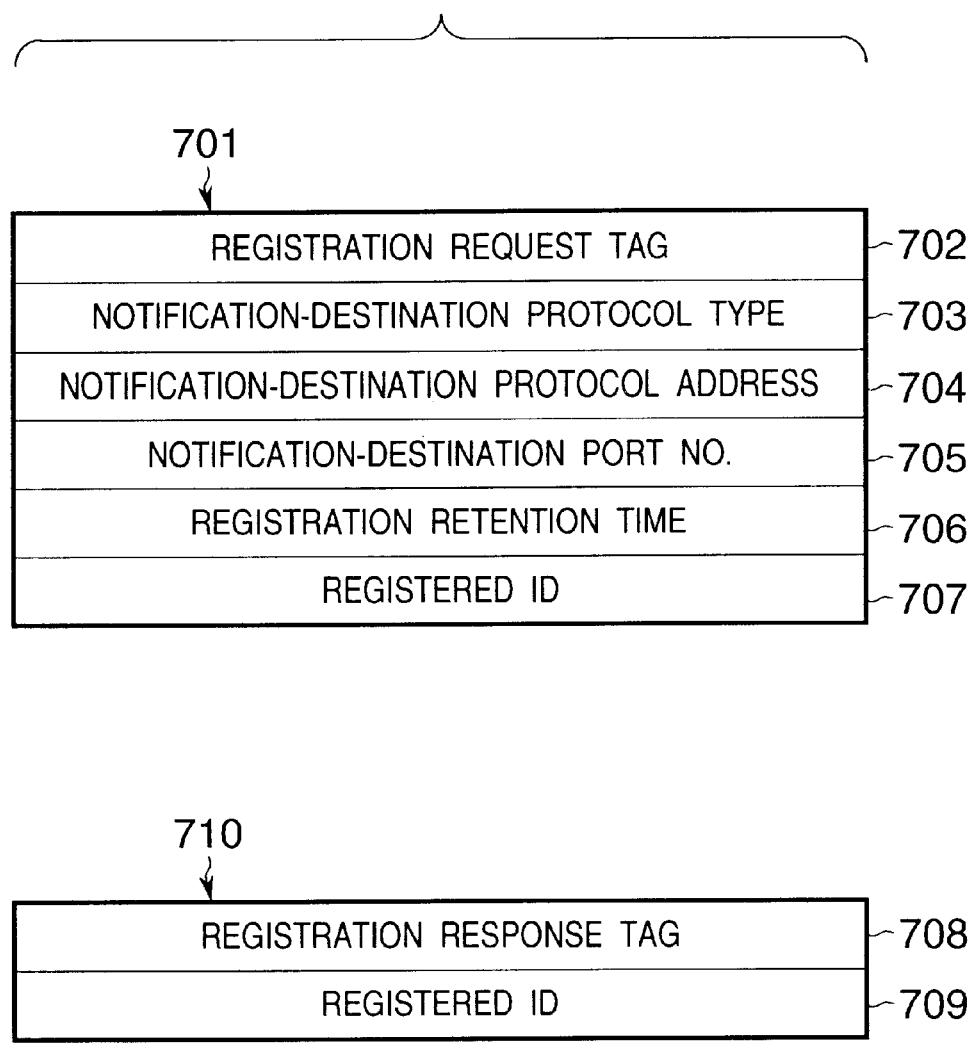
FIG. 7 is a diagram showing the format of a request for printer-status notification registration and the format of the response to this request communicated between the computer and the printer.

FIG. 7 is a diagram showing the format of a printer-status notification destination registration request 701 and the format 710 of the response to this request exchanged by the computer 101 and printer 103.

In FIG. 7, a registration request message 701 is the printer-status notification destination registration request. A registration request tag 702 is indicative of the registration request. A notification-destination protocol 703 specifies a protocol by which the computer 101 receives notification of printer status. A notification-destination address 704 specifies an address at which the computer 101 receives the notification of printer status. A notification-destination port number 705 specifies a port number at which the computer 101 receives the notification of printer status. A registration retention time 706 is a time at which notification of printer status is registered, as will be described later. Notification of status can continue to be received from the printer providing that the computer 101 registers (updates) the registration retention time afresh within this registration retention time. A registered ID 707 stipulates a registered ID sent back from the printer 103. At the time of initial registration the ID will have not yet been decided and therefore 0 is specified at such time.

A registration response message 710 is a response which the printer 103 sends back when the printer-status notification destination registration request is received from the computer 101. A registration response tag 708 indicates that this is the registration response message. A registered ID 1709 represents a registered identifier.

Figure 8:
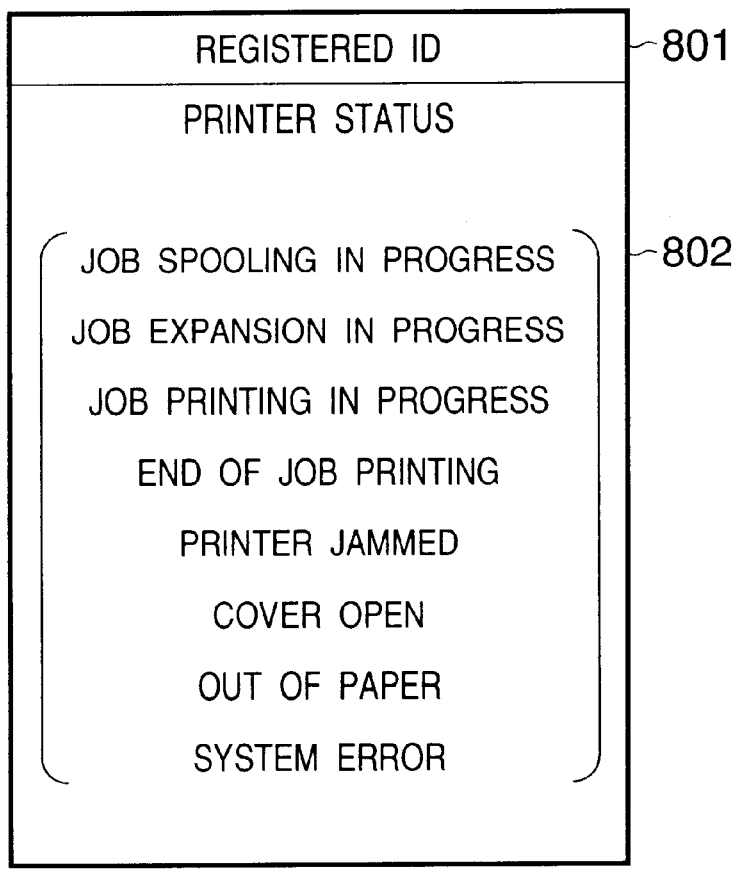
FIG. 8 is a diagram showing the format of printer-status notification made by the printer attendant upon a change in printer status.

FIG. 8 is a diagram showing the format of the printer-status notification 108 made by the printer 103 attendant upon a change in printer status.

A registered ID 801 in FIG. 8 is a registered ID sent back by the registration response message 710. Printer status 802 indicates the status of this printer. In this embodiment, notification is given of printer status such as job spool number, printing in progress, end of job, printer jammed, cover open, printer out of paper, and system error.

Figure 9:
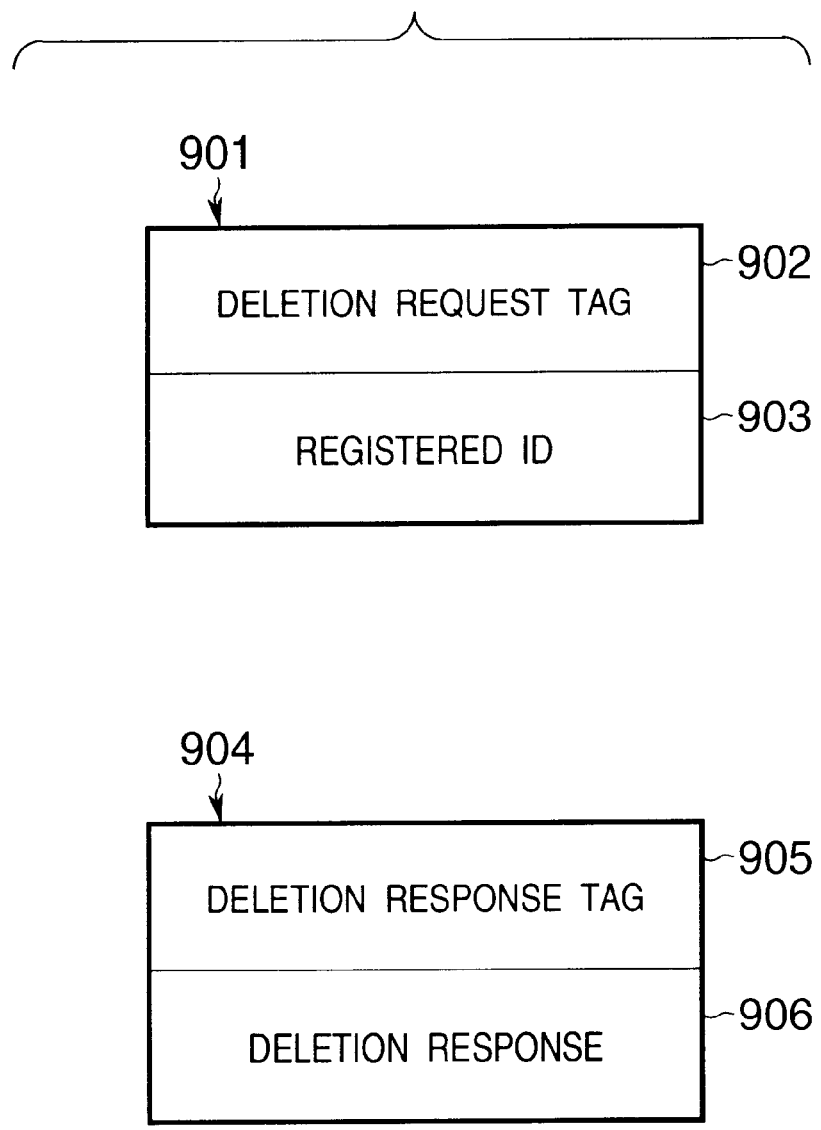
FIG. 9 is a diagram showing a printer-status notification deletion request and the response to this request communicated between the computer and the printer.

FIG. 9 is a diagram showing a printer-status notification destination deletion request and the response to this request communicated between the computer 101 and the printer 103.

A deletion request message 901 in FIG. 9 is a deletion request which the computer 101 sends to the printer 103, and a deletion request tag 902 indicates that this is the deletion request message. A registered ID 903 is a registered ID sent back from the printer 103 at the time of registration. This indicates the registered ID of the object of deletion.

A deletion response message 904 is a deletion response which the printer 103 sends back to the computer 101. A deletion response tag 905 indicates that this is the deletion response message. A deletion response 906 indicates that the deletion ended normally.

FIG. 10 is a diagram showing the format of a notification-destination registration table which the printer 103 retains in the RAM 403.

A registered ID 1001 in FIG. 10 is an identifier appended by the printer in dependence upon the registration request. A notification-destination protocol section 1002, a notification-destination address section 1003, a notification-destination port number section 1004, and a registration retention time section 1005 store the notification-destination protocol 703, notification-destination address 704, notification-destination port number 705 and registration retention time 706, respectively, specified by the registration request message.

In the example of FIG. 10, a total of three items of notification destination information have been registered and retained. For example, under the registered ID 1234, TCP/IP has been specified as the notification-destination protocol, 192.9.2.155 has been specified as the notification-destination address, and 9045 has been specified as the port number. The registration retention time indicates time until deletion. Here the registration retention time is 10 minutes, meaning that the information of registered ID 1234 will be deleted in 10 minutes.

Ordinarily, the information of a registered ID is deleted by the deletion request message 901 sent from the computer 101. According to the present invention, the printer 103 deletes the notification-destination information upon elapse of the registration retention time if the monitoring application 305 of the computer 101 quits without sending the deletion request message 901 for some external reason. This assures that the notification-destination registration table will not become full.

To accomplish this, the printer 103 deletes this information upon elapse of the registration retention time. If the computer 101 wishes to continue monitoring, it sends the printer 103 the notification-destination registration request afresh before the registration retention time expires.

Figure 11:
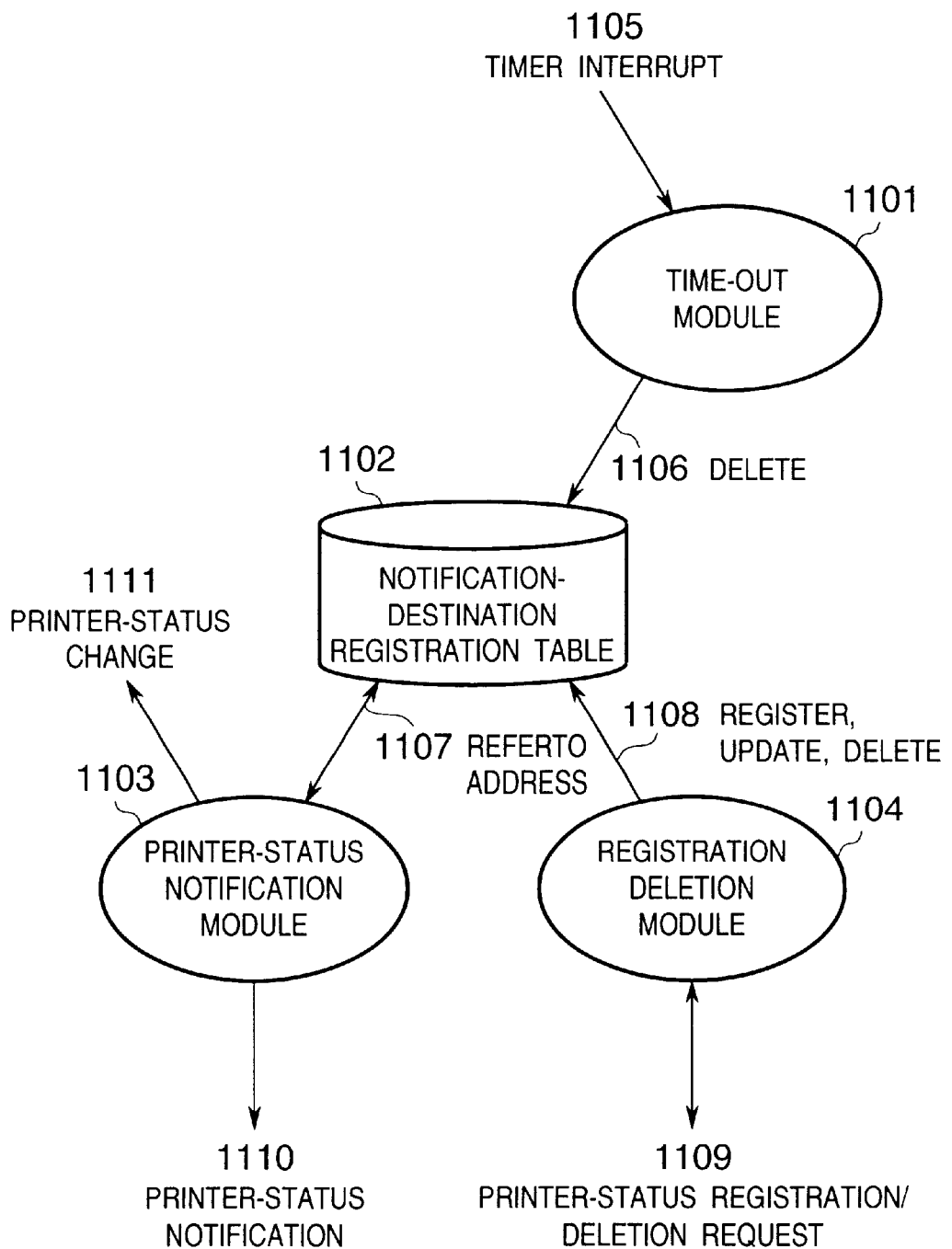
FIG. 11 is a diagram showing the details of module configuration in the printer module of the printer.

FIG. 11 is a diagram showing the details of module configuration in the printer-status management module 603 of the printer 103.

A time-out module 1101 receives a time-out interrupt 1105 and decrements registration retention time 1005, which is contained in a notification-destination registration table 1102, at regular time intervals. Information for which the registration retention time has become zero is deleted (1106). A printer-status notification module 1103 receives a printer-status change 1111, refers (1107) to the notification-destination address in the notification-destination registration table 1102 and gives notification of printer status (1110). A registration deletion module 1104 receives a printer-status registration/deletion request 1109 and registers, updates or deletes (1108) information in the notification-destination registration table 1102.

The printer deletes or updates an entry of the notification-destination registration table managed by the printer, based on the registration retention time which has been registered by the monitoring application. The notification-destination registration table is stored in the RAM of the printer.

In reality, the registration retention time in the notification-destination registration table is managed by the time-out module of the printer.

The registration retention time may be set to zero. When an entry has a retention time value other than zero, the entry is stored in the printer during the set time. The retention time zero means that the retention time is an infinity. Note that the retention time value indicating an infinity may be a numeral other than zero or may be a code.

Figure 12:
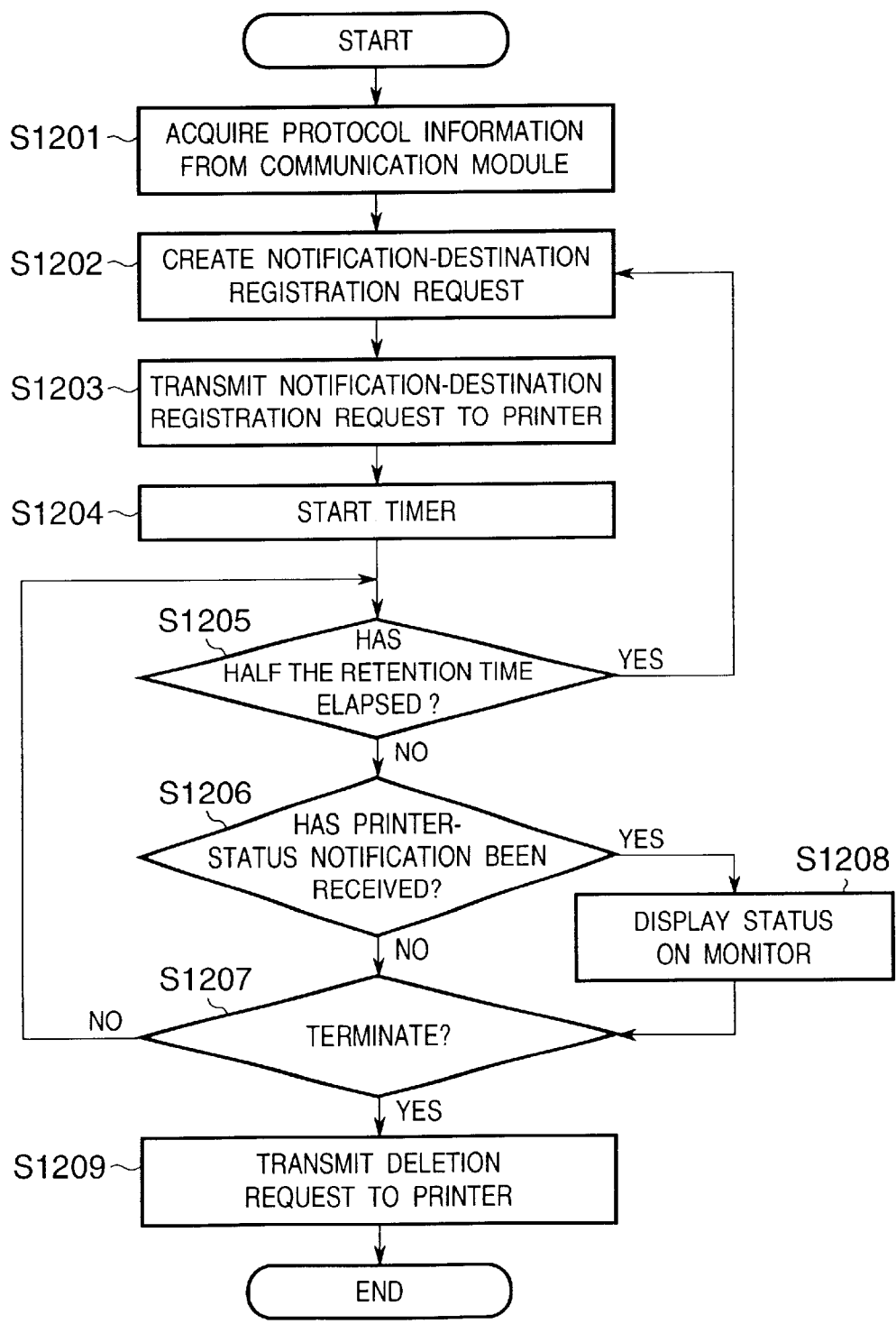
FIG. 12 is a flowchart illustrating the flow of processing of a monitoring application run by the computer.
Figure 13:
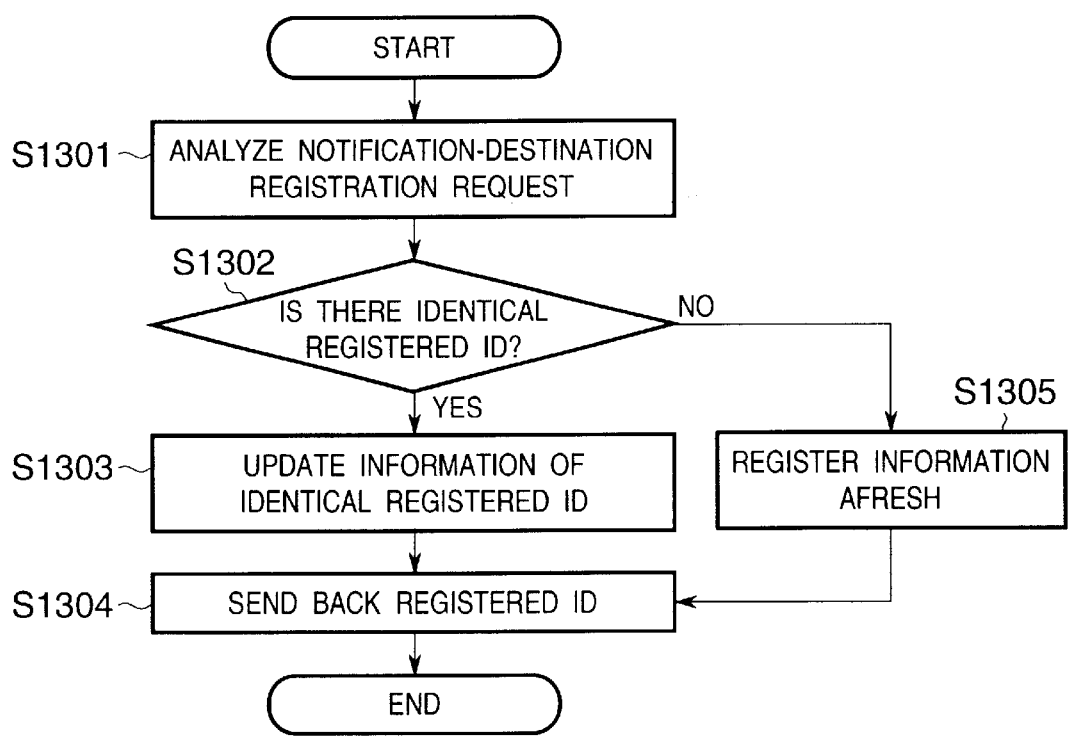
FIG. 13 is a flowchart illustrating the flow of processing of a registration deletion module in the printer.
Figure 14:
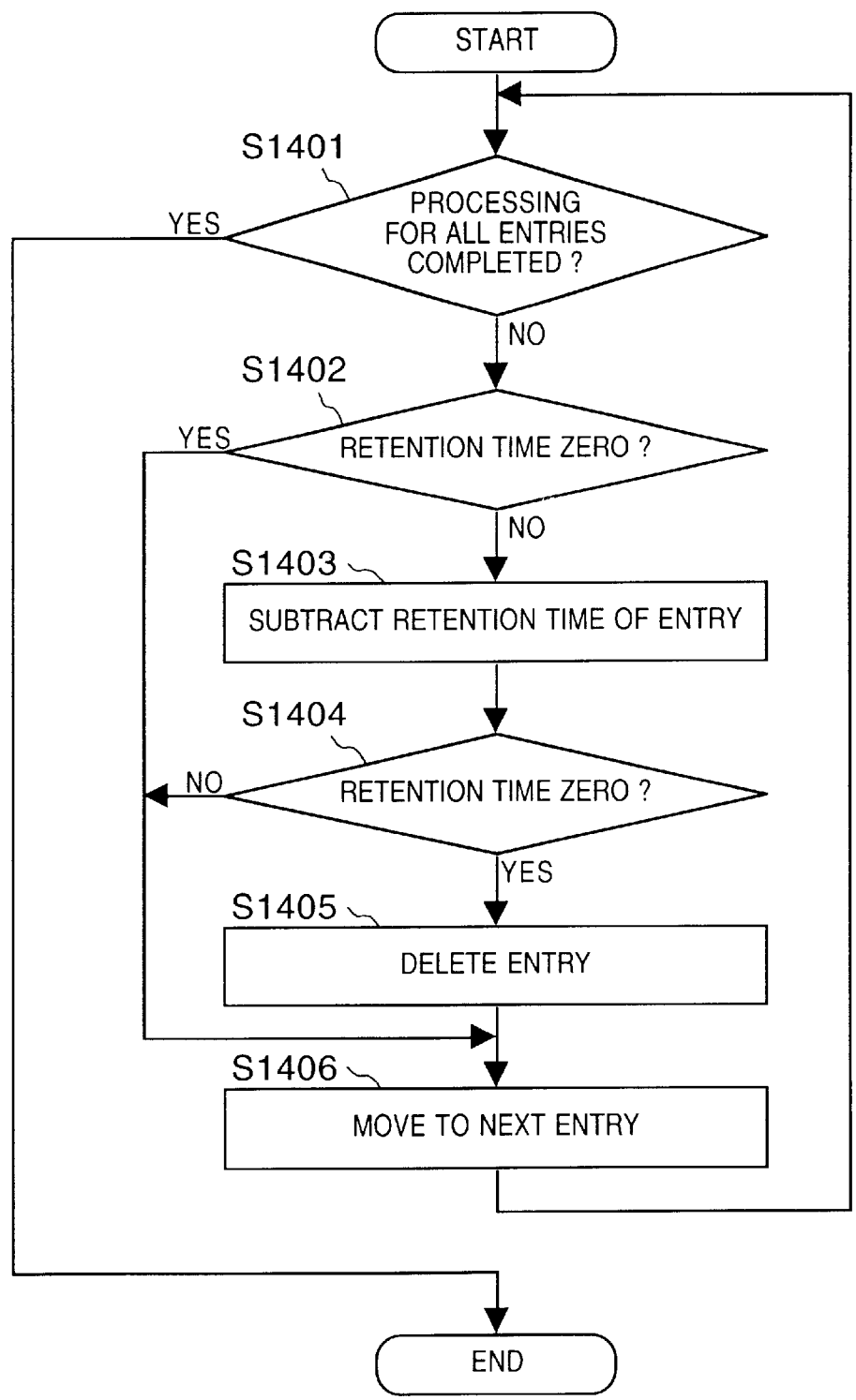
FIG. 14 is a flowchart illustrating the flow of processing of a time-out module in the printer.
Figure 15:
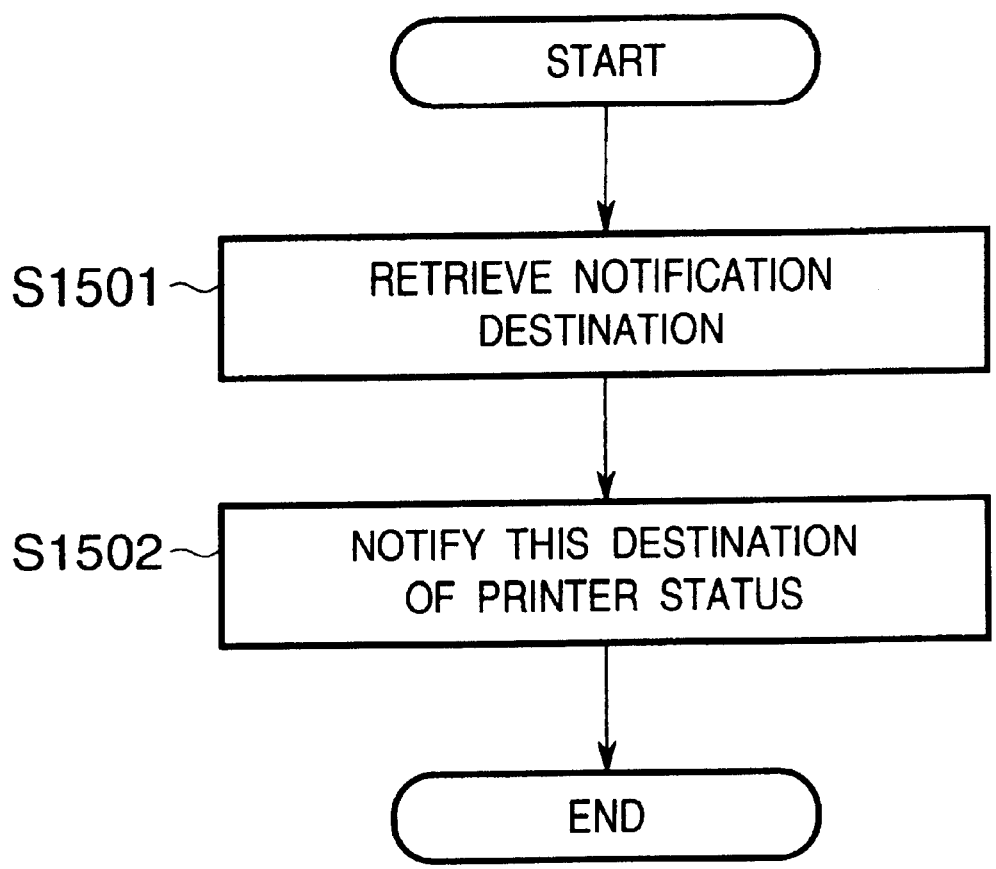
FIG. 15 is a flowchart illustrating the flow of processing of a printer-status notification module in the printer.

FIG. 12 is a flowchart showing the flow of processing of the monitoring application 305 in the computer 101, FIG. 13 is a flowchart showing the flow of processing of the registration deletion module 1104 in the printer 103, FIG. 14 is a flowchart illustrating the flow of processing of the time-out module 1101 in the printer 103, and FIG. 15 is a flowchart illustrating the flow of processing of the printer-status notification module 1103 in the printer 103.

The flow of processing by the monitoring application 305 run by the computer 101 will be described with reference to FIG. 12.

The monitoring application monitors a status notification sent by the printer until a user commands to end the monitoring (see FIG. 12). The monitoring application updates registration information for each entry before expiration of the registration retention time set last time in the printer. To realize this, when half the registration retention time set in the notification-destination registration table of the printer elapses, a registration request is issued to the printer again, then registration information is set again, and the registration retention time is extended.

When the monitoring application 305 is started up, the monitoring application 305 acquires protocol information, which includes protocol type, protocol address and port number, from the communication module 303 (S1201). The monitoring application 305 then creates the printer-status notification destination registration request 701 (S1202). The monitoring application 305 transmits the created notification-destination request 701 to the printer 103 via the communication module 303 (S1203). After the request 701 is transmitted, the monitoring application 305 starts up the timer 209 (S1204). Next, the monitoring application 305 determines whether a half of the set retention time has passed (S1205). If the half of the retention time has passed, the information that has been registered in the printer 103 will be deleted and, hence the monitoring application 305 issues the notification-destination registration request again. Since the notification registration is re-registered when half the set retention time has elapsed, deletion of registered information is prevented.

If it is found at step S1205 that the half of the retention time has not elapsed, the monitoring application 305 determines whether notification of the status of the printer has been received from printer 103 (S1206). If notification has been received, the status is displayed on the monitor 104 via the input/output controller 206, whereby the fact that the-printer status changed is displayed (S1208). If it is found at step S1206 that notification has not been received, then the monitoring application 305 determines whether a terminate request has been issued (S1207). If a terminate request has not been issued, the monitoring application 305 monitors the printer again. If a terminate request has been issued, then the monitoring application 305 sends the deletion request to the printer 103 (S1209). The monitoring application then quits.

Thus, when the registration retention time expires, the host computer issues a new notification-destination registration request at or before such expiration and receives notification of printer status. If notification of printer status is no longer required, the host computer sends the deletion request to the printer to delete registration.

The flow of processing for registration and updating performed by the registration deletion module 1104 in printer 103 will now be described with reference to FIG. 13.

Upon receiving the notification-destination registration request from the computer 101, the registration deletion module analyzes the notification-destination registration table (S1301) and determines whether there is a registered ID identical with the registered ID contained in the notification-destination registration request (S1302). If the answer is "NO", the registration deletion module registers notification-destination information anew (S1305). If the answer is "YES", on the other hand, then the registration deletion module updates the information of this registered ID (S1303). The registration retention time also is reset at this time. The response 710 containing the registered ID is created at sent back to the host computer (S1304).

The flow of processing of the time-out module 1101 in printer 103 will now be described with reference to FIG. 14.

When time-out module 1101 is started up by the time-out interrupt 1105, the time-out module 1101 searches each entry of the notification-destination registration table 1102. Then, whether or not the processing for all the entries has been completed is determined (S1401). The time-out module 1101 then determines whether or not the registration retention time value is zero (S1402). If the retention time value is zero, it indicates that the retention time for the entry is infinite. Thus, the time-out module 1101 does not perform deletion processing, but moves onto the processing for the next entry (S1406). If the retention time value is a value other than zero, the value indicates the retention time. Thus, the time period elapsed after the last update is subtracted from the retention time (S1403). As a result of the subtraction, if the retention time value becomes zero or less (S1404), the entry is deleted from the table (S1405). In this manner, retention time of entries are subsequently updated, and the processing is repeated until all entries in the table are updated.

The flow of processing of the printer-status notification module 1103 in printer 103 will now be described with reference to FIG. 15.

When the change 1111 in printer status occurs, the printer-status notification module 1103 acquires the notification-destination information from the notification-destination registration table 1102 (S1501). The printer-status notification module sends each registered notification destination of the printer status (illustrated in FIG. 8) in accordance with the protocol, address and port number of the notification destination obtained from the acquired information (S1502).

Thus, even in a case where deletion of notification-destination registration cannot be performed from the host computer, registration can be deleted if the set period of time elapses. As a result, a status notification not actually being used can be prevented from being output from the printer. Further, since only communication destinations that are being continuously updated by the host computer remain in the notification-destination registration table, the table can be prevented from overflowing owing to unnecessary notification-destination information.

In this embodiment, the notification-destination registration table is managed by the printer. However, in a case where this table is managed by a network board and the printer develops an abnormality, similar effects can be obtained even if the network board sends the communication packets.

In such case, the steps shown in FIGS. 13 to 15 are executed by the network board driver. By using the network board and driver, the present invention is applicable not only to printers but also to general network devices.

In addition, similar effects can be expected not only in the case of a network but also in the case of a centronics interface.

Other Embodiments

Although the above embodiment has described a printer apparatus, the similar effects can be expected in a combination apparatus such as a Multiple-Function Printer (MFP). In addition, by causing a program which realizes the functions of the present embodiment to be executed on the server, the present invention can realize device management by the server. For instance, the status of various network devices, printers, MFP, HUB, routers or the like can be managed by a server having a program which realizes the functions of the present embodiment by executing the steps FIGS. 13 to 15. Then, the monitoring application whose processing is shown in FIG. 12 is installed in another computer connected to the server. By using the monitoring application, event notification information, indicating a condition under which a device notifies an event, is registered in the server, and devices connected to the network are monitored.

Similar to the foregoing embodiment, the monitoring application sets registration retention time for the event notification information. In a case of retaining the registration, the event notification information is updated before the registration retention time expires. In addition, the monitoring application receives event notification from the server and displays the notification.

The server manages each device connected to the network, and notifies an event when occurred, in accordance with the event information registered by the monitoring application. When the registered registration retention time expires, the registration information is deleted.

As described above, the present invention is also applicable to device management performed by a server. By virtue of this, even in a case where a host computer is unable to delete event notification information, registration information is deleted by the server after the elapse of set time. Accordingly, it is possible to prevent the server from issuing unnecessary event notification. Moreover, because the server retains only the event notification information kept being updated by the monitoring application, it is possible to prevent unnecessary event notification information from wastefully using the storage area.

The present invention can be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system or the like running on the computer performs a part of or the entire process in accordance with the designation of program codes and implements the functions according to the embodiments.

The present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the present invention, as described above, it is possible to reliably delete information in a notification-destination registration table retained in order that a printer may report its status. As a result, even if a host computer fails to make the deletion, the registration information will no longer continue to be held in the printer. This makes it possible to realize the monitoring of printer status while reducing traffic on the network.

As many apparently widely different embodiments of the present invention can be made without departing from the spirit and scope thereof, it is to be understood that the invention is not limited to the specific embodiments thereof except as defined in the appended claims.

What is claimed is:

1. A printing system comprising at least one information processing apparatus and a printing apparatus, wherein said information processing apparatus includes requesting means for issuing a status notification request to said printing apparatus in a case where status notification from said printing apparatus is requested; and said printing apparatus includes:

means for registering the information processing apparatus that issued the status notification request as a destination of status notification; and deletion means for deleting this registration if a predetermined period of time elapses following registration.

2. The system according to claim 1, wherein the status notification request contains address information of the information processing apparatus that issued this request.

3. The system according to claim 1, wherein the status notification request contains information on a communication protocol of the information processing apparatus that issued this request.

4. The system according to claim 1, wherein the status notification request contains information on a port of the information processing apparatus that issued this request.

5. The system according to claim 1, wherein said information processing apparatus further includes means for deleting a notification destination that has been registered in said printing apparatus.

6. The system according to claim 1, wherein said printing apparatus further includes updating means for updating information on a registered notification destination in a case where origin of issuance of the status notification request that has been received has been registered as the present notification destination.

7. A printing apparatus connected to at least one information processing apparatus, comprising:

receiving means for receiving a status communication request from said information processing apparatus;

registration means for registering the information processing apparatus that issued the status notification request as a destination of status notification; and deletion means for deleting this registration if a predetermined period of time elapses following registration.

8. The apparatus according to claim 7, wherein the status notification request contains address information of the information processing apparatus that issued this request.

9. The apparatus according to claim 7, wherein the status notification request contains information on a communication protocol of the information processing apparatus that issued this request.

10. The apparatus according to claim 7, wherein the status notification request contains information on a port of the information processing apparatus that issued this request.

11. The apparatus according to claim 7, further comprising updating means for updating information on a registered notification destination in a case where origin of issuance of the status notification request that has been received has been registered as the present notification destination.

12. A method of controlling a printing apparatus connected to at least one information processing apparatus, comprising:

a receiving step of receiving a status communication request from said information processing apparatus;

a registration step of registering the information processing apparatus that issued the status notification request as a destination of status notification; and a deletion step of deleting this registration if a predetermined period of time elapses following registration.

13. The method according to claim 12, wherein the status notification request contains address information of the information processing apparatus that issued this request.

14. The method according to claim 12, wherein the status notification request contains information on a communication protocol of the information processing apparatus that issued this request.

15. The method according to claim 12, wherein the status notification request contains information on a port of the information processing apparatus that issued this request.

16. The method according to claim 12, further comprising an updating step of updating information on a registered notification destination in a case where origin of issuance of the status notification request that has been received has been registered as the present notification destination.

17. A computer-readable storage medium storing a program for enabling the method of claim 12 to be implemented by a computer.

18. The printing system according to claim 1, wherein the status notification request includes information indicative of an expiration time of registration contents registered by said printing apparatus.

19. The printing system according to claim 18, wherein in a case where the expiration time is a predetermined value, said printing apparatus does not delete the registration contents.

20. A network system constructed with at least two information processing apparatuses connected to the network system, wherein a first information processing apparatus comprises request means for issuing a status notification request to a second information processing apparatus when requesting status notification to the second information processing apparatus, and the second information processing apparatus comprises registration means for registering the first information processing apparatus, which has issued the status notification request, as a notification destination of the status notification, and deletion means for deleting the registration after an elapse of a predetermined time period from the registration.

21. A second information processing apparatus connected to a first information processing apparatus, comprising:

reception means for receiving a status notification request from the first information processing apparatus;

registration means for registering the first information processing apparatus, which has issued the status notification request, as a notification destination of the status notification; and deletion means for deleting the registration after an elapse of a predetermined time period from the registration.

* * * * *